(12) United States Patent (10) Patent No.: US 9,046,357 B1
Cayo (45) Date of Patent: Jun. 2, 2015

(54) LEVEL ACCESSORY FOR MAKING STRAIGHT LINES THAT ARE PARALLEL WITH THE LEVEL

(71) Applicant: Rick Cayo, Medford, OR (US)

(72) Inventor: Rick Cayo, Medford, OR (US)

( * ) Notice: Subject to any disclaimer, the term of this patent is extended or adjusted under 35 U.S.C. 154(b) by 194 days.

(21) Appl. No.: 13/901,434

(22) Filed: May 23, 2013

Related U.S. Application Data

(60) Provisional application No. 61/650,920, filed on May 23, 2013.

(51) Int. Cl.
*B44D 3/00* (2006.01)
*G01C 9/02* (2006.01)
*B44D 3/38* (2006.01)

(52) U.S. Cl.
CPC ... *G01C 9/02* (2013.01); *B44D 3/38* (2013.01)

(58) Field of Classification Search
CPC .................................. B44D 3/38; G01C 9/02
USPC ............................................. 33/379, 413, 414
See application file for complete search history.

(56) References Cited

U.S. PATENT DOCUMENTS

| | | | | |
|---|---|---|---|---|
| 2,589,500 A * | 3/1952 | Landon et al. | | 33/414 |
| 4,381,607 A * | 5/1983 | Place | | 33/413 |
| 4,819,337 A * | 4/1989 | Noyes | | 33/414 |
| 5,138,771 A * | 8/1992 | Lee | | 33/414 |
| 5,588,610 A * | 12/1996 | McGee | | 242/379 |
| 6,487,783 B1 * | 12/2002 | Thomas, Jr. | | 33/414 |
| 2013/0326895 A1 * | 12/2013 | Bureau | | 33/379 |

* cited by examiner

*Primary Examiner* — G. Bradley Bennett
(74) *Attorney, Agent, or Firm* — Plager Schack LLP

(57) ABSTRACT

Some embodiments of the invention provide a novel parallel line level accessory configured to produce a straight line marking on a surface, where the produced straight line marking is adjacent to a level and parallel to the long axis of the level. In some embodiments, the parallel line level accessory comprises a set of bracket fasteners, a container with a surface marking substance and a line, a rotating wheel, a line alignment guide, and a pulley. The set of bracket fasteners of some embodiments attach the parallel line level accessory to the level. In some embodiments, the parallel line level accessory is adjustable for attaching to a level of any size.

10 Claims, 6 Drawing Sheets

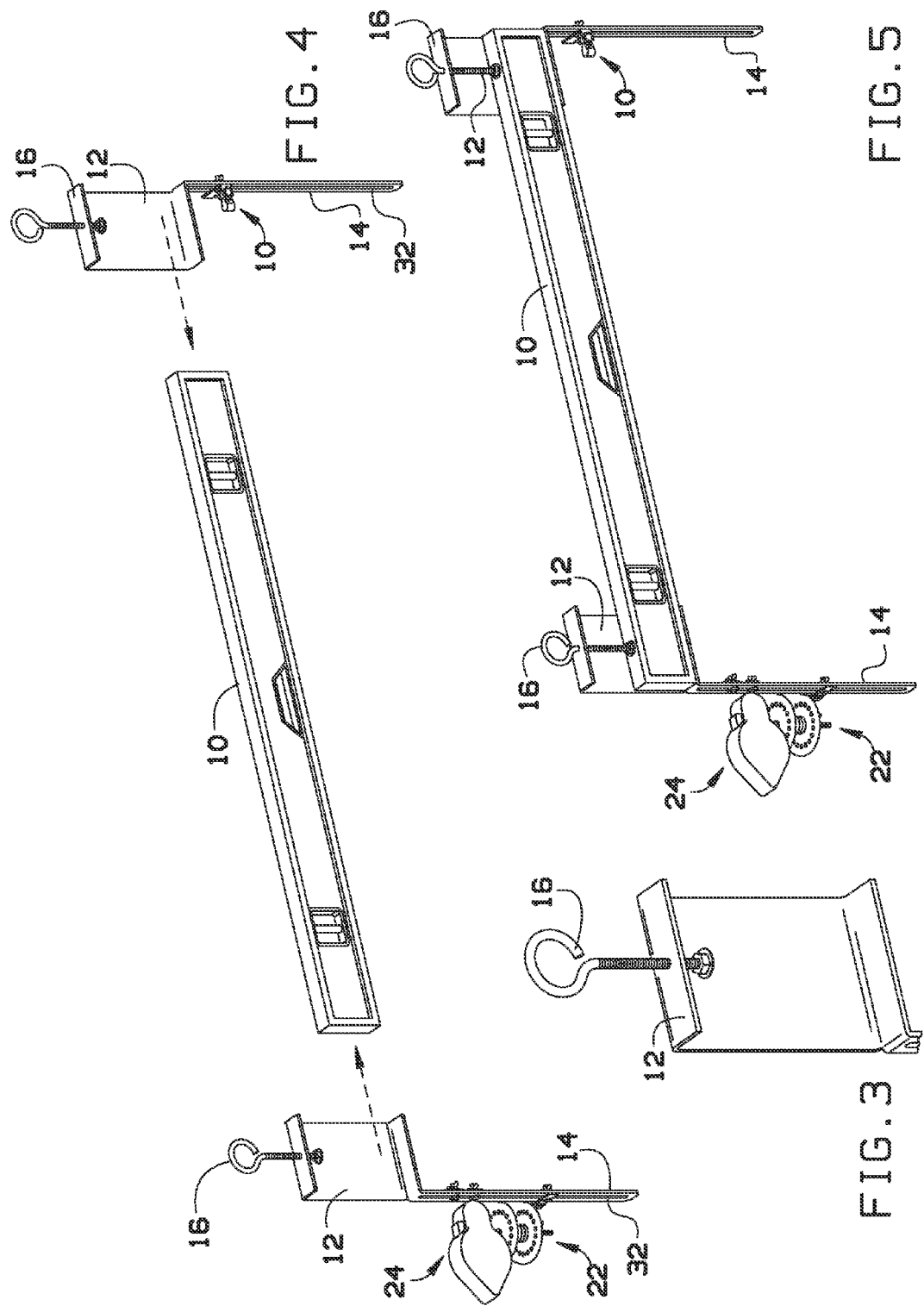

LEVEL ACCESSORY FOR MAKING STRAIGHT LINES THAT ARE PARALLEL WITH THE LEVEL

CLAIM OF BENEFIT TO PRIOR APPLICATION

This application claims benefit to U.S. Provisional Patent Application 61/650,921, entitled "This device is an accessory to a common carpentry level that produces a line parallel and adjacent to the body of a level," filed May 23, 2012. The U.S. Provisional Patent Application 61/650,921 is incorporated herein by reference.

BACKGROUND

Many people often need to make straight and level lines on a surface. For example, a person mounting several items to a wall at a certain height may need to identify a straight line across the wall at which mount each item. In some cases, a person will use a level to ensure that the straight line does not slant off from the intended line direction. However, it is exceedingly difficult to contemporaneously perform leveling and marking (of a straight line parallel with level). Even when a person only focuses on holding the level and drawing a line against an edge of the level, the opportunity for error is great. For instance, the longer the level is, the harder is to hold the level steady with only one hand. Also, a certain amount of pressure is applied to the level when drawing a line against an edge of the level, thus increasing the risk that the level gets moved around while the line is drawn. Thus, people generally perform the leveling separately from the marking when drawing a straight line against a surface. However, this is too tedious and time consuming for many people. Furthermore, it is less likely that the drawn line will be parallel with the level when these operations are performed separately.

In some cases, people get help from others to make a straight line that is parallel with a level. For example, a first person might hold up a level while a second person draws a line adjacent to and parallel with the level. While it is nice to get the help of others, in many instances it is not feasible. For instance, a person who is high up on a ladder may have to perform the leveling and marking alone. People can use both hands to do both activities in some cases. However, using both hands is often difficult and sometimes not possible. In some cases, people use devices such as lasers to project a laser line along a wall or surface. However, someone needs to hold the laser and set its direction. Thus, using a laser does not help a single person to perform both leveling and marking operations at about the same time.

These problems are exacerbated for workers at construction sites because governments and municipalities often impose safety regulations on workers at construction sites. For instance, the Occupational Safety and Health Administration ("OSHA") of the United States Federal Government requires that construction workers ascending or descending ladders maintain at least one hand on the ladder. Thus, it is difficult for a single person to make a straight line that is parallel with a level on a surface from bottom to top when the surface would require the person to use a ladder to reach the top. This is problematic for many workers at construction sites who need to make straight lines parallel to a level on surfaces in order to identify the locations at which nails and screws should be added to the surface.

To date, these problems have not been resolved. The U.S. Pat. No. 6,698,774, issued to Duncan, discloses a parallel spacing guide. However, Duncan's spacing guide is for making a line on the ground at a one to four foot distance from a wall. U.S. Pat. No. 8,256,125, issued to Jarzynka, pertains to a sliding square and tape measure for making angled lines and includes bubble levels, but levels the job of line making to the holder of the sliding square and tape measure. Thus, these references are not adequate for making a straight level line on a surface. Thus, what is needed is a way for a person holding a level to make a straight line parallel to and adjacent to the body of the level.

BRIEF SUMMARY

Some embodiments of the invention provide a novel parallel line level accessory configured to produce a straight line marking on a surface, where the produced straight line marking is adjacent to a level and parallel to the long axis of the level. In some embodiments, the parallel line level accessory comprises a set of bracket fasteners, a container with a surface marking substance and a line, a rotating wheel, a line alignment guide, and a pulley. The set of bracket fasteners of some embodiments attach the parallel line level accessory to the level. In some embodiments, the parallel line level accessory is adjustable for attaching to a level of any size.

In some embodiments, the parallel line level accessory further comprises a set of bracket rails connected to the bracket fasteners. In some embodiments, the container and the line alignment guide are attached to a bracket rail at a same measured distance from the level to make lines with the surface marking substance that are parallel to the long axis of the level. In some embodiments, the container and line alignment guide are attached to a bracket rail at a first end of the long axis of the level and the pulley is attached to a bracket rail at a second, opposite end of the long axis of the level. In some embodiments, the surface marking substance is applied to the line as the line is slid out of the container at the first end. The line wraps over the pulley at the second end and is tightened with the rotating wheel back at the first end. In some embodiments, the rotating wheel locks the line when the line exceeds a threshold tightness in which the line can be snapped to transfer a line of surface marking substance from the line to the surface.

In some embodiments, the parallel line level accessory further comprises a sting in a retractable container. In some embodiments, each bracket fastener comprises a measuring guide.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matters can be embodied in other specific forms without departing from the spirit of the subject matters.

BRIEF DESCRIPTION OF THE DRAWINGS

Having described the invention in general terms, reference is now made to the accompanying drawings, which are not necessarily drawn to scale, and wherein:

FIG. 3 conceptually illustrates a detail perspective view of an example attachment bracket of a parallel line level accessory in some embodiments.

FIG. 4 conceptually illustrates a back perspective exploded view of a parallel line level accessory of some embodiments.

FIG. 5 conceptually illustrates a back perspective view of a parallel line level accessory of some embodiments when the attachment brackets are attached and secured to the parallel line level accessory.

DETAILED DESCRIPTION

In the following detailed description, several examples and embodiments of the invention are described. However, it will be clear to a person skilled in the art that the invention is not limited to the embodiments set forth and can be adapted for any of several other uses.

Some embodiments of the invention provide a novel parallel line level accessory configured to produce a straight line marking on a surface, where the produced straight line marking is adjacent to a level and parallel to the long axis of the level. In some embodiments, the parallel line level accessory comprises a set of bracket fasteners, a container with a surface marking substance and a line, a rotating wheel, a line alignment guide, and a pulley. The set of bracket fasteners of some embodiments attach the parallel line level accessory to the level. In some embodiments, the parallel line level accessory is adjustable for attaching to a level of any size.

In some embodiments, the bracket fasteners attach to the top and/or end of a level. In some embodiments, the container and the line alignment guide are locked on the same measurement to create a line that is parallel and adjacent to the body of the level. The rotating wheel in some embodiments retrieves, tightens, and locks the line. In some embodiments, the pulley is set to the same measurement as the container and the line alignment guide.

The parallel line level accessory, therefore, allows a person to produce straight and parallel lines. Thus, anytime a person needs a line parallel to a level, the person would be able to just attach the line to their level and parallel line level accessory would be in position to produce a line.

In some embodiments, the parallel line level accessory further comprises a set of bracket rails connected to the bracket fasteners. In some embodiments, the container and the line alignment guide are attached to a bracket rail at a same measured distance from the level to make lines with the surface marking substance that are parallel to the long axis of the level. In some embodiments, the container and line alignment guide are attached to a bracket rail at a first end of the long axis of the level and the pulley is attached to a bracket rail at a second, opposite end of the long axis of the level. In some embodiments, the surface marking substance is applied to the line as the line is slid out of the container at the first end. The line wraps over the pulley at the second end and is tightened with the rotating wheel back at the first end. In some embodiments, the rotating wheel locks the line when the line exceeds a threshold tightness in which the line can be snapped to transfer a line of surface marking substance from the line to the surface.

Figure 1:
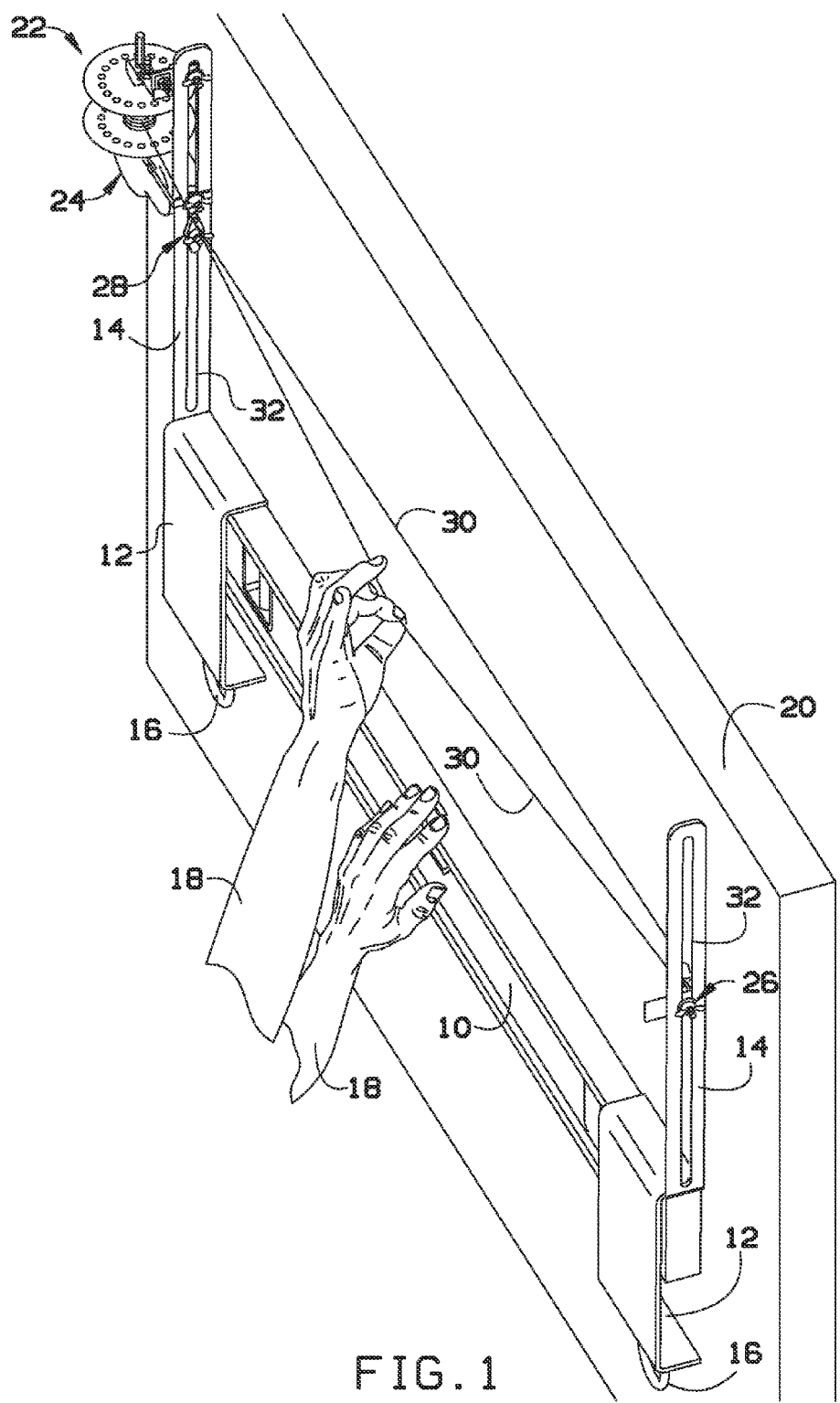
FIG. 1 conceptually illustrates a perspective view during use of an example parallel line level accessory of some embodiments.

FIG. 1 conceptually illustrates a perspective view during use of an example parallel line level accessory of some embodiments. The parallel line level accessory comprises a pair of brackets 12, a pair of bracket rails 14, a pair of attachment bracket threaded eye bolts 16, a sliding chalk spool and bracket sub-assembly 22, a sliding chalk line encasement and bracket sub-assembly 24, a sliding chalk line pulley and bracket sub-assembly 26, a sliding chalk line guide sub-assembly 28, and a chalk line 30. Each bracket rail 14 comprises an attachment bracket rail slot 32. As shown, the parallel line level accessory attaches to a level 10 that a person 18 is using against a surface 20.

In some embodiments, the brackets 12 are attached to the level 10 to secure the parallel line level accessory to the level. In some embodiments, the brackets 12 slide onto the ends of the level 10. In these embodiments, the length of the long axis of the level can be any length. In other embodiments, the brackets attach to the level in other ways. For instance, the brackets may fit over the level or may snap onto the level. The attachment brackets 12 are further described by reference to FIGS. 2-5, below.

In some embodiments, the bracket rails 14 extend from the attachment brackets 12 to extend the parallel line level accessory in a direction perpendicular to the long axis of the level. As each bracket rail 14 includes an attachment bracket rail slot 32, multiple components of the parallel line level accessory can be attached. In some embodiments, the sliding chalk spool and bracket sub-assembly 22, the sliding chalk line encasement and bracket sub-assembly 24, and the sliding chalk line pulley and bracket sub-assembly 26 can be adjusted vertically along the bracket rails 14 to adjust the distance from the level at which the chalk line gets produced on the surface.

In some embodiments, the parallel line level accessory is used in a particular configuration that allows a person to snap a chalk line above the level. In the example parallel line level accessory illustrated in FIG. 1, for instance, the attachment bracket rails 14 are shown in a first upward pointing configuration and the level 10 is shown at the bottom of the parallel line level accessory. Although such a configuration of the parallel line level accessory works well to produce line markings in some situations, in other situations, different configurations of the parallel line level accessory are used. In some embodiments, the parallel line level accessory is used in a configuration that allows a person to snap a chalk line below the level. In other embodiments, the parallel line level accessory is used in an upright configuration in which the long axis of the level is vertically oriented. In these embodiments, a person can snap a vertical chalk line to the left or right of the level. Moreover, the chalk line gets produced parallel to the level. The bracket rails 14 and the different configurations for using them are further described below, by reference to FIGS. 2-5.

In some embodiments, the attachment bracket threaded eye bolts 16 double as turn-screws. The eye bolts 16 screw into the bottoms of the brackets 12 and secure the brackets to the level. The attachment bracket threaded eye bolts/turn-screws 16 are further described by reference to FIGS. 2-5, below.

In some embodiments, the sliding chalk spool and bracket sub-assembly 22 retrieves, tightens, and locks the line 30. In some embodiments, the sliding chalk spool and bracket sub-assembly 22 locks the line 30 when the line exceeds a threshold tightness in which the line can be snapped to transfer a line of surface marking substance from the line to the surface 20. As shown in FIG. 1, the person 18 is pulling the line 30 to snap a line of chalk on the surface 20. The sliding chalk spool and bracket sub-assembly 22, the sliding chalk line encasement and bracket sub-assembly 24, and the sliding chalk line pulley and bracket sub-assembly 26 are described further below, by reference to FIGS. 6-7.

In some embodiments, the chalk line 30 is any strong line capable of being wound, snapped, and pulled over pulleys. The chalk line must also be of sufficient strength to resist a certain amount of tightness. The line 30 shown in this figure starts at the sliding chalk line encasement and bracket sub-assembly 24, gets pulled through the sliding chalk line guide sub-assembly 28, and then over the pulley in the sliding chalk line pulley and bracket sub-assembly 26, and finally wound up on the sliding chalk spool and bracket sub-assembly.

As noted above, although the example illustrated by FIG. 1 shows the parallel line level accessory as being above the level, in some embodiments, the parallel line level accessory is configured for use below the level.

Figure 2:
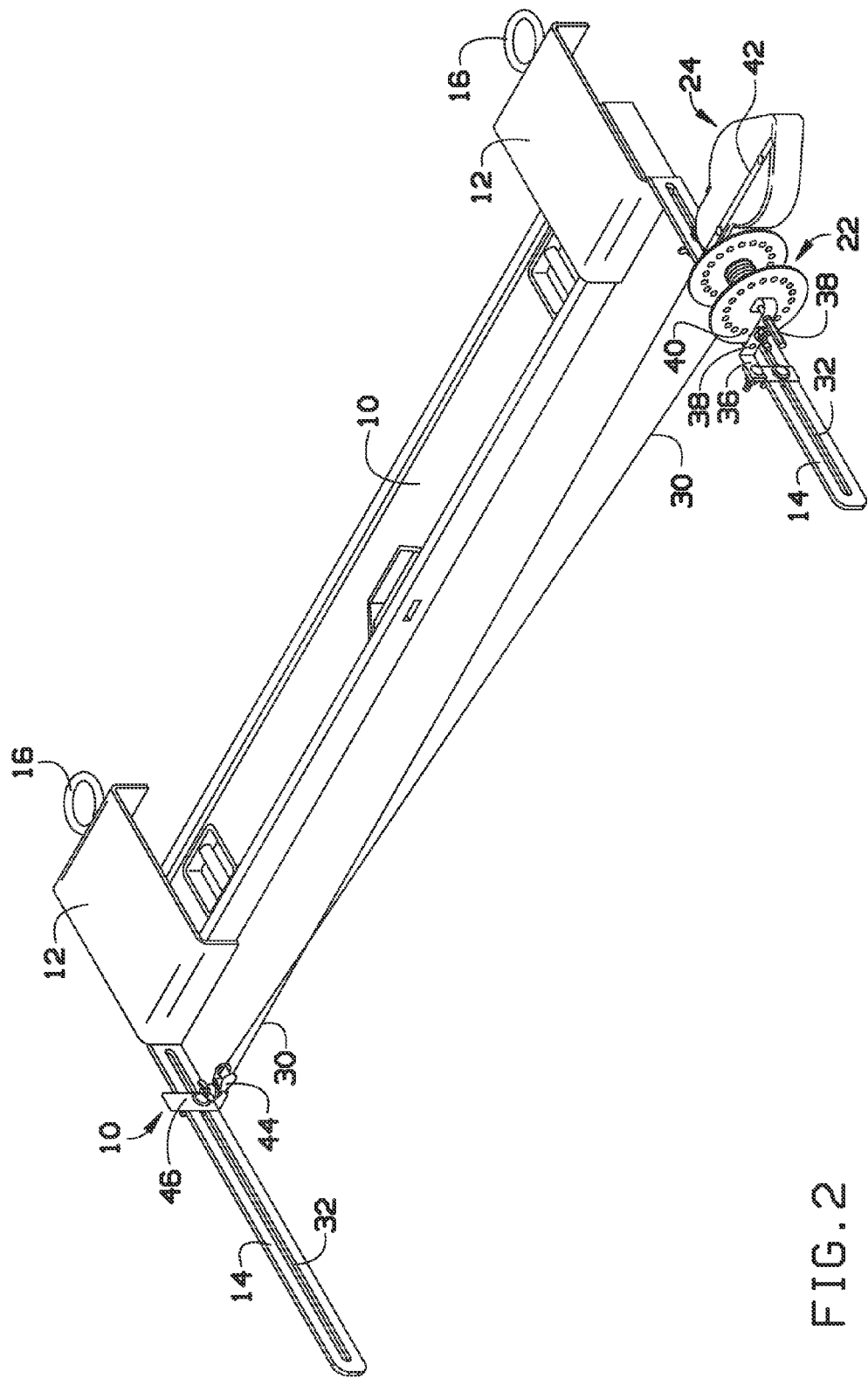
FIG. 2 conceptually illustrates another perspective view of the example parallel line level accessory illustrated in FIG. 1.

FIG. 2 conceptually illustrates another perspective view of the example parallel line level accessory illustrated in FIG. 1. As can be seen from the perspective view in this figure, the parallel line level accessory is shown with the level at the top. The parallel line level accessory further comprises a spool bracket 36, a spool turn shaft 38, a spool bracket lock hole 40, a set of spool lock holes 42, a chalk line encasement bracket, and a pulley 46.

As the level is at the top, it possible to hang the parallel line level accessory by using the attachment bracket threaded eye bolt. This is further described below in FIGS. 3-5.

In some embodiments, the parallel line level accessory is designed to easily attach to and work with a wide range of levels of different dimensions. FIG. 3-5 conceptually illustrate component and assembly details of the parallel line level accessory which demonstrate the ease of using the parallel line level accessory with any of several levels with different dimensions. In some embodiments, the attachment brackets 12 attach the parallel line level accessory to a level and, after attachment, the threaded eye bolts/turn screws 16 secure the attachment brackets 12 to the level. As the components of the parallel line level accessory attach directly or indirectly to the attachment brackets, the parallel line level accessory is thereby attached and secured to the level.

FIG. 3 conceptually illustrates a detail perspective view of an example attachment bracket of a parallel line level accessory in some embodiments. As shown in this figure, the bracket 12 has a pair of opposing plates for aligning the bracket 12 with a level. The threaded eye bolt 16 is able to screw down into the bracket until the top ringed portion of the eye bolt 16 meets one of the bracket plates. The bottom of the threaded eye bolt 16 includes a flattened portion that prevents the eye bolt from being screwed into the level when screwed downward through the bracket plate and from being removed from the bracket when screwed upward.

The design of the bracket 12 and threaded eye bolt/turn-screw 16 allows the parallel line level accessory to be easily attached to a level. FIG. 4 conceptually illustrates a back perspective exploded view of a parallel line level accessory of some embodiments. In this figure, the brackets 12 are shown by dashed lines as being slid onto the level 10. Also shown are parallel line level accessory components including the bracket rails 14, the sliding chalk spool and bracket sub-assembly 22, the sliding chalk line encasement and bracket sub-assembly 24, the sliding chalk line pulley and bracket sub-assembly 26, and the bracket rail slots 32. Although not all components of a parallel line level accessory are illustrated in FIGS. 3-5 (e.g., no chalk line, etc.), a person skilled in the art can appreciate that other components can be included.

Because the components of the parallel line level accessory are all attached directly or indirectly to the attachment brackets 12, the entire parallel line level accessory assembly gets attached to the level once the brackets are attached and the eye bolts are screwed tight to secure the brackets to the level. FIG. 5 conceptually illustrates a back perspective view of a parallel line level accessory of some embodiments when the attachment brackets are attached and secured to the parallel line level accessory.

Figure 6:
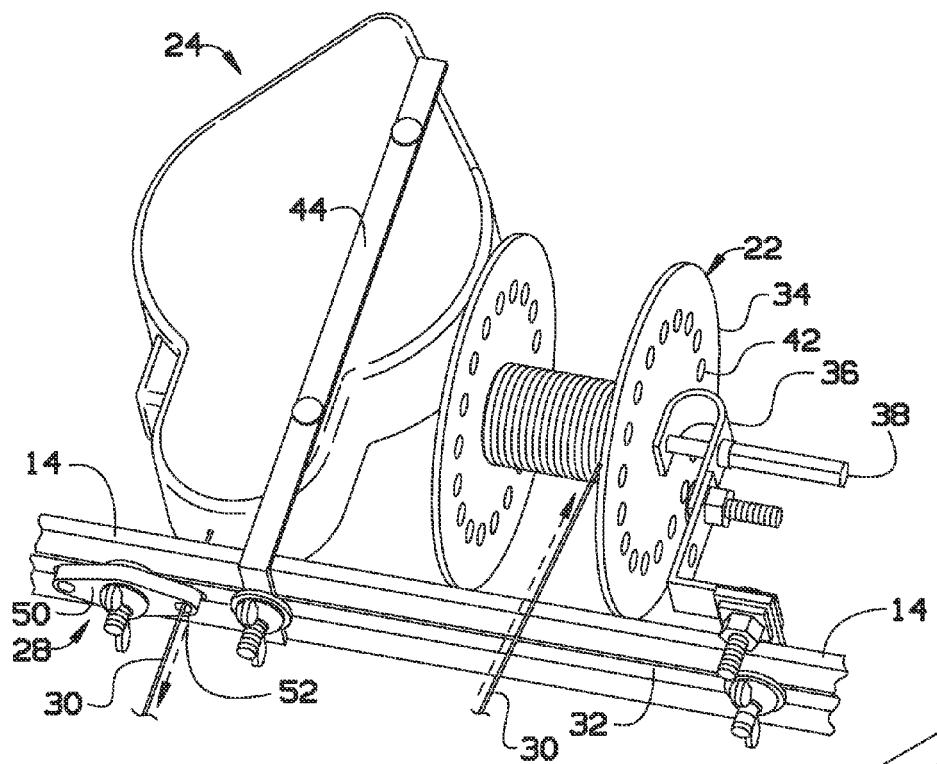
FIG. 6 conceptually illustrates a detail perspective view of chalk line operation using a sliding chalk line encasement of a parallel line level accessory in some embodiments.

Like the ability to attach the parallel line level accessory to any size and/or dimension of a level allows the parallel line level accessory to be easily set for use, the actual operation of the parallel line level accessory to produce a straight level line is also easy, despite the number of components and the arrangement of those components. As noted above, while the parallel line level accessory is capable of producing any kind of marking line, the examples described in this specification pertain to chalk line marking lines. FIG. 6 conceptually illustrates a detail perspective view of chalk line operation using a sliding chalk line encasement of a parallel line level accessory in some embodiments. In addition to the components of the parallel line level accessory described in relation to FIGS. 1-5, the parallel line level accessory of this figure also includes a spool 34, a chalk line guide 50, and a chalk line guide hole 52.

In some embodiments, the spool 34 is used for winding the line to draw a chalk line on the surface. When the spool turn shaft 38 is cranked to wind the line around the spool 34, the chalk line 30 of some embodiments is pulled from the sliding chalk encasement 24. As the line slides out of the encasement 24, the line is covered in a marking material. The line passes through a chalk line guide hole 52 of a chalk line guide 50. In some embodiments, the chalk line guide 50 ensures that the line is parallel to the level 10. If a parallel line is not desired, the chalk line guide 50 can be disregarded in order to angle the chalk line accordingly. In some embodiments, the chalk line guide 50 and chalk line guide hole 52 is part of the sliding chalk line guide 28, which is attached to the parallel line level accessory by way of the attachment bracket rail 14.

In some embodiments, the marking material coming out of the encasement 24 is chalk. In other embodiments, the marking material is another powder that can overlay a temporary line on a surface. In some embodiments, the marking material is a liquid that is overlaid on the surface as the line 30 slides out of the encasement 24. Whatever the material in the encasement, the line coming out of the encasement is doused with the material, and when snapped to a surface, leaves a temporary straight line. When the level is held at a position considered to be level (i.e., 0 degrees or 90 degrees), the resulting line that gets laid is also level.

Figure 7:
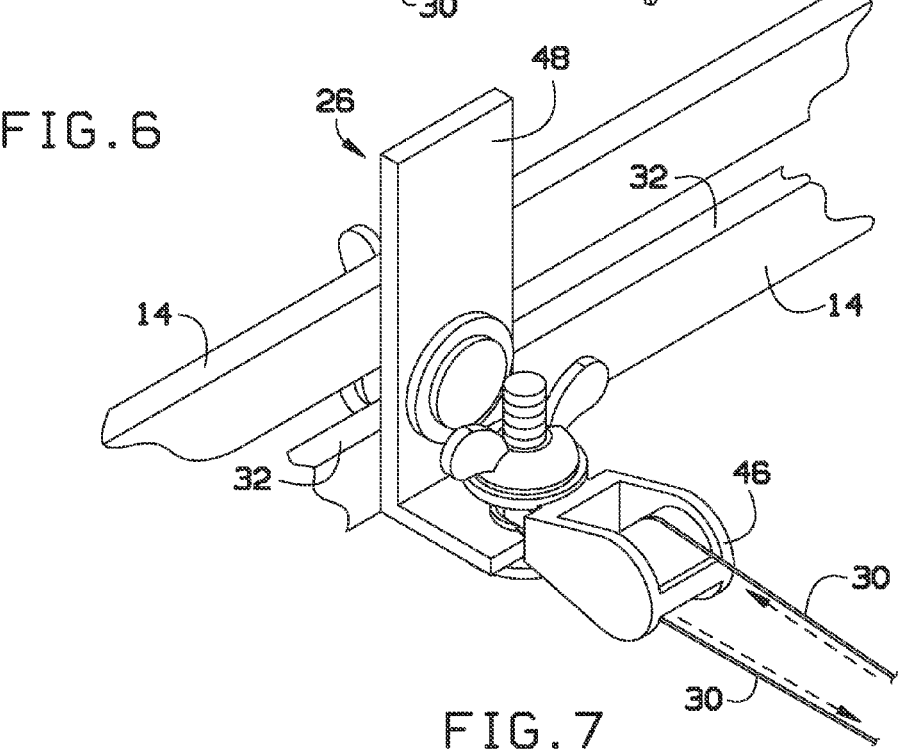
FIG. 7 conceptually illustrates a detail perspective view of chalk line operation using a sliding chalk line pulley of a parallel line level accessory in some embodiments.

In some embodiments, the relationship between the chalk line 30 being wound up on the spool 34 and the chalk line sliding out from the encasement 24, is based on a pulley 46 that is attached to the opposite bracket rail 14. FIG. 7 conceptually illustrates a detail perspective view of chalk line operation using a sliding chalk line pulley of a parallel line level accessory in some embodiments. As shown in this figure, the parallel line level accessory includes a pulley bracket 48 attached to the bracket rail 14 by a bolt connecting through the bracket rail slot 32. A pulley 46 is attached to the pulley bracket 48 and the line 30 gets pulled up over the pulley from the chalk box encasement 24 and down to the spool 34. The pulley bracket 48 and pulley 46 are part of the sliding chalk line pulley and bracket sub-assembly 26 of some embodiments.

Figure 8:
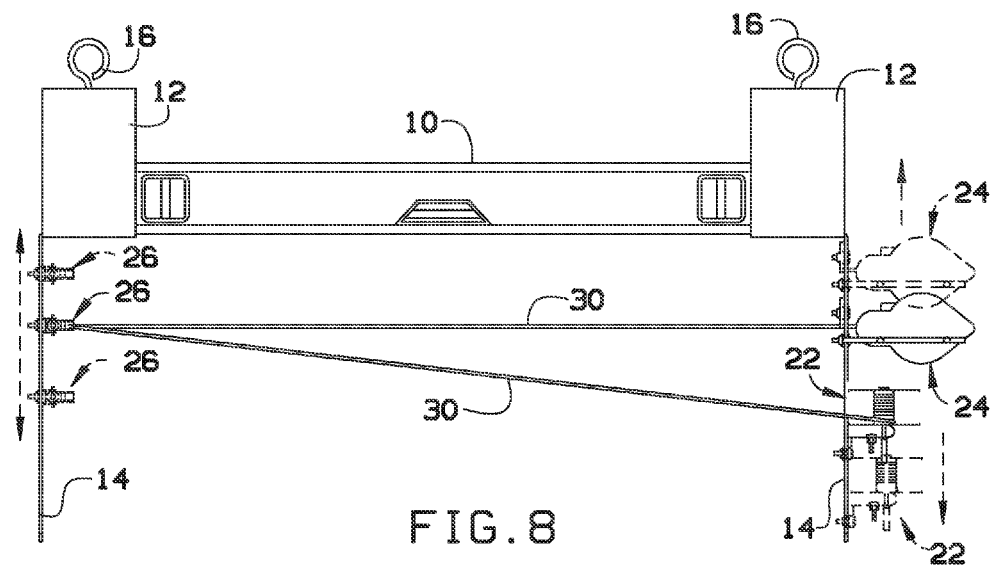
FIG. 8 conceptually illustrates a front view of a parallel line level accessory in some embodiments.

FIG. 8 conceptually illustrates a front view of a parallel line level accessory in some embodiments. This figure demonstrates how the chalk line 30 is parallel to the level 10 regardless of the distance from the level that the chalk line will be laid. As shown by the dashed arrows pointing up and down, the sliding chalk line encasement and bracket sub-assembly 24 can move to any position of the attachment rail bracket 14. Likewise, the sliding chalk line pulley and bracket sub-assembly 26 moves up and down (shown by the dashed arrows) in accordance with the sliding chalk line encasement and bracket sub-assembly 24. The line 30 starting at the sliding chalk line encasement and bracket sub-assembly 24 slides out through chalk line guide hole 52 of the chalk line guide 50 connected to the bracket rail 14, over the pulley 46 at the sliding chalk line pulley and bracket sub-assembly 26 that is connected to the opposite bracket rail 14, and back to the spool 34 of the sliding chalk spool and bracket sub-assembly 22 connected to the formerly mentioned attachment bracket rail 14.

Figure 9:
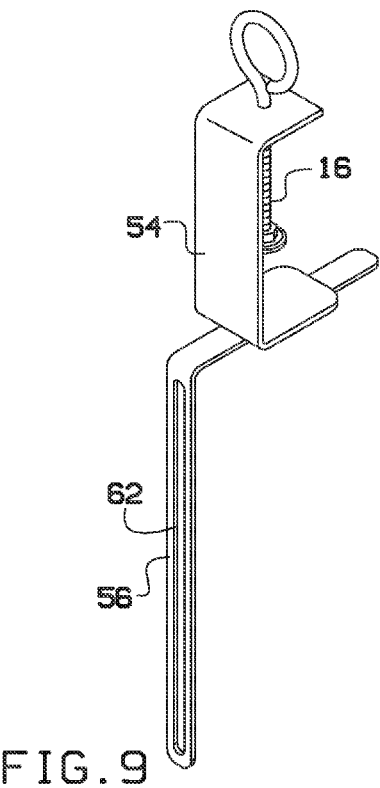
FIG. 9 conceptually illustrates a perspective view of a clamp and bracket of a parallel line level accessory in some embodiments.
Figure 10:
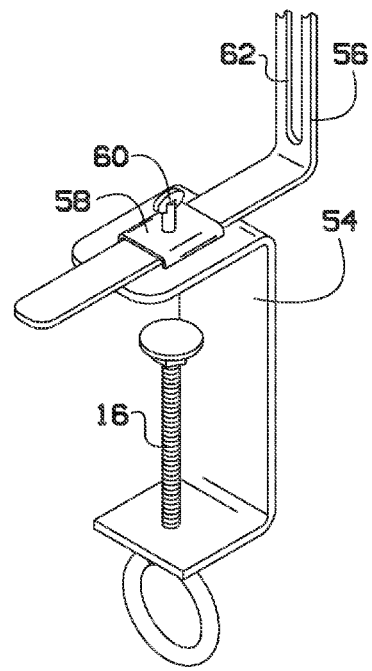
FIG. 10 conceptually illustrates a lower perspective view of a clamp and bracket of a parallel line level accessory in some embodiments.

In some embodiments, the level that is connected to the parallel line level accessory can be set to the top of the parallel line level accessory for performing leveling operations or to the bottom of the parallel line level accessory for performing leveling operations. FIGS. 9-10 conceptually illustrate upper and lower perspective views of a clamp and bracket of a parallel line level accessory in some embodiments. The upper and lower perspective views correspond to operating the level at the top of the parallel line level accessory and the bottom of the parallel line level accessory, respectively. Furthermore, in these embodiments, an alternative type of bracket 54 is used in place of the bracket 12 used in the parallel line level accessory described above by reference to FIGS. 1-8. As the bracket 54 used in these embodiments is different from the bracket 12 used in other embodiments, the associated sliding bracket rail 56 is different from the sliding bracket rail 14 used in the parallel line level accessory described above. In addition, in some embodiments of the parallel line level accessory, a thumbscrew is used to connect the sliding bracket rail 56 to the attachment bracket 54. This allows the sliding bracket rail 56 to be configured in alignment with the bracket 54, if desired, or out of alignment with the bracket 54, if needed. For example, the chalk line used to make a line marking on a surface can extend beyond the length of the level by moving the sliding rail brackets 56 (on both ends of the level) out to a point that is wider than the width of the level. On the other hand, a shorter line could be made on the surface by moving the sliding bracket rails 56 inward. In both cases, the thumbscrew can be loosened to reset the width and tightened to lock the width at which to produce a chalk line marking on the surface.

Figure 11:
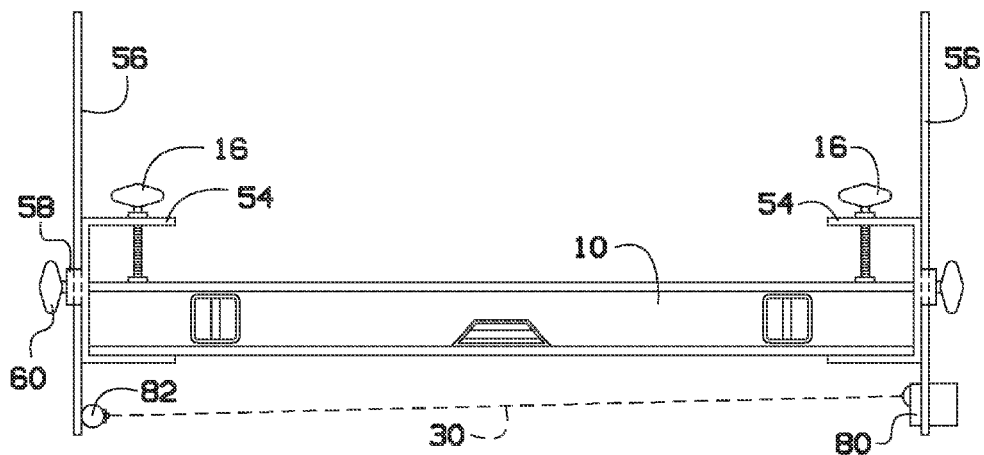
FIG. 11 conceptually illustrates a front view in some embodiments of a parallel line level accessory that includes alternative attachment brackets and sliding bracket rails.

While several embodiments of the parallel line level accessory are described above by reference to FIG. 1-10, other alternative embodiments are also conceived for the parallel line level accessory. A first alternative embodiment is conceptually illustrated in FIG. 11 which shows a front view of a parallel line level accessory that includes the attachment brackets and sliding bracket rails. In particular, a thumbscrew 60 for each sliding bracket rail 56 is included to secure the sliding bracket rail to the level bracket 54. Also, the line 30 is shown as coming from a string box 80 by way of a string retracting device 82 that automatically retracts the lines. In some embodiments, the retracting device 82 automatically locks the vertical position of the string retracting device 82 when the vertical position along the sliding bracket rail 56 of the retracting device 82 is approximately equal to the vertical position along the sliding bracket rail 56 of the string box 80. In this way, the parallel line level accessory is able to approximate a path that is parallel with the long axis of the carpentry level, such that the parallel path allows a person to snap a chalk line from one sliding bracket rail 56 at a first end of the long axis of the carpentry level to the other sliding bracket rail 56 at the second end of the long axis of the carpentry level. In other words, the vertical distances of the string box 80 and the string retracting device 82 along the sliding bracket rails do no affect the ability of the parallel line level accessory to identify and apply a line to a surface where the line is parallel to the carpentry level being held by the person.

Figure 12:
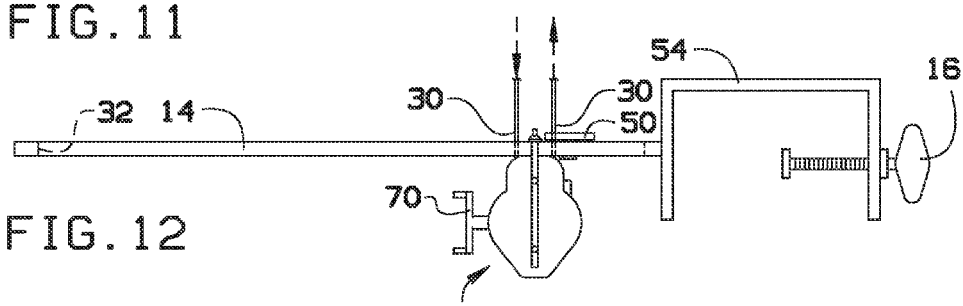
FIG. 12 conceptually illustrates a front view of a parallel line level accessory with a hand reel in some embodiments.

In another embodiment, the line 30 extends out from and return to the sliding reeled chalk line encasement and bracket sub-assembly. FIG. 12 conceptually illustrates a front view of a parallel line level accessory with a hand reel in some embodiments where the line 30 extends out from and returns to the sliding reeled chalk line encasement and bracket sub-assembly 70, passing through the chalk line guide to constrain the line path to a path that is parallel with the carpentry level.

Figure 13:
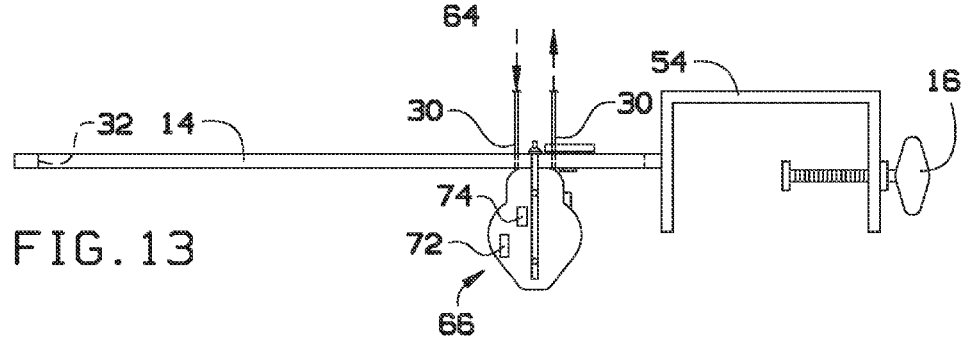
FIG. 13 conceptually illustrates a front view of an electrically operated parallel line level accessory in some embodiments.

FIG. 13 conceptually illustrates a front view of an electrically operated parallel line level accessory in some embodiments. Similar to the parallel line level accessory described by reference to FIG. 12, this figure also shows the line 30 extending out from and returning to an electric reeled chalk line encasement and bracket sub-assembly 66. However, instead of a sliding reeled chalk line encasement and bracket sub-assembly handle 70, the electric reeled chalk line encasement 66 includes an electric activation button 72 and corresponding electric lock 74. The electric activation button 72 of some embodiments releases the line 30 when depressed by a person. The lock 74 tightens and locks the line when depressed. In this way, the electric reeled chalk line encasement and bracket sub-assembly 66 with the electric activation button 72 and corresponding electric lock 74 provide functionality for easily setting a parallel and straight line to surface.

Figure 14:
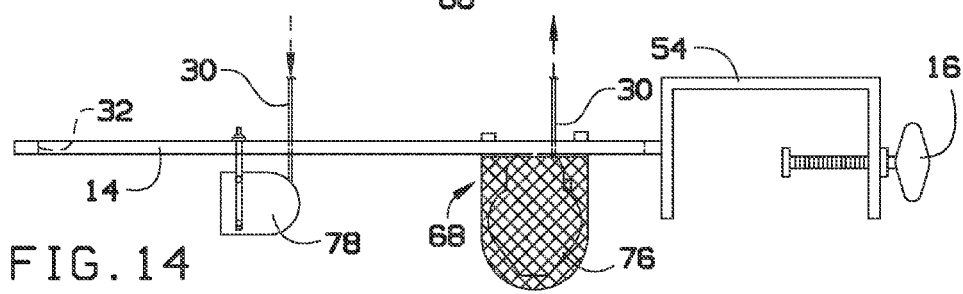
FIG. 14 conceptually illustrates a front view of an alternative embodiment of a parallel line level accessory.

FIG. 14 conceptually illustrates a front view of an alternative embodiment of a parallel line level accessory. In this example, the parallel line level accessory includes retrieving string box 78 and a chalk line encasement 76. In particular, the line 30 going out from the sliding bracket rail 14 is released from chalk line encasement 76, while the line coming in from the opposing sliding bracket rail 14 is received at the string box 78 a disparate location further down the sliding bracket rail 14.

In any of the embodiments described above by reference to FIGS. 1-14, the type of use for the parallel line level accessory depends on the scope of the project. As all of the embodiments allow a single user to generate a straight line that is parallel to the level, it is easier to performing multiple operations with ease. For instance, you can perform leveling operation and line generation operations.

While the invention has been described with reference to numerous specific details, one of ordinary skill in the art will recognize that the invention can be embodied in other specific forms without departing from the spirit of the invention. For instance, many of the figures illustrate conventional baseball bats and training bats intended for practicing baseball hitting drills. However, many of the illustrated training bats could be intended for practicing softball hitting drills. Thus, one of ordinary skill in the art would understand that the invention is not to be limited by the foregoing illustrative details, but rather is to be defined by the appended claims.

I claim:

1. A parallel line level accessory attached to a carpentry level and configured to produce a straight line marking on a surface, the parallel line level accessory comprising:
    a set of two bracket fasteners that attach to opposing ends of the carpentry level, said ends being ends of the carpentry level along the long axis;
    a line alignment guide that constrains an extension path of a line passing through a hole of the alignment guide to a path that is parallel with the long axis of the carpentry level;
    a container comprising a surface marking substance and a line, said line for producing a line of surface marking substance on the surface when the line is extended through the hole of the line alignment guide and between the opposing ends of the carpentry level;
    a rotating wheel that removes slack from the line by winding the line until a threshold tightness is exceeded, wherein the threshold tightness is sufficiently tight for a person to snap the line to apply the line of surface marking substance to the surface; and
    a pulley around which the line is wrapped when extended out from the container, said line wrapping around the pulley back to the rotating wheel.

2. The parallel line level accessory of claim 1, wherein the surface marking substance is chalk.

3. The parallel line level accessory of claim 1, wherein the line produces a vertical line of surface marking substance on the surface when the level is held in a level vertical orientation.

4. The parallel line level accessory of claim 1, wherein the line produces a horizontal line of surface marking substance on the surface when the level is held in a level horizontal orientation.

5. The parallel line level accessory of claim 1 further comprising a set of two bracket rails attached to the set of two bracket fasteners, wherein the set of two bracket rails extend a distance away from the carpentry level and perpendicular to the long axis of the carpentry level.

6. The parallel line level accessory of claim 5, wherein the alignment guide, the container, the rotating wheel, and the pulley are attached to the bracket rails.

7. The parallel line level accessory of claim 1, wherein each of the two bracket fasteners comprises a threaded bolt for securing the bracket fastener to one of the ends of the carpentry level.

8. A parallel line level accessory attached to a carpentry level and configured to produce a straight line marking on a surface, the parallel line level accessory comprising:
    two level brackets that attach to the long axis ends of the carpentry level;
    two bracket rails attached to the two level brackets and oriented perpendicular to the long axis of the carpentry level, wherein a first bracket rail attaches to a first level bracket at a first end of the carpentry level and a second bracket rail attaches to a second level bracket at a second end of the carpentry level;
    a line container attached to the first bracket rail at a particular distance along the first bracket rail from the carpentry level, the line container comprising a quantity of line to extend a distance to the second bracket rail to make a straight line on the surface; and
    a line retracting device attached to the second bracket rail, wherein the line retracting device slides vertically along the second bracket rail until the line retracting device is locked at approximately the particular distance along the second bracket rail from the carpentry level to allow a person to apply a straight line to the surface parallel with the carpentry level.

9. The parallel line level accessory of claim 8, wherein the level brackets each comprise a threaded bolt to secure the parallel line level accessory to the carpentry level.

10. The parallel line level accessory of claim 8 further comprising a thumbscrew for securing the bracket rails to the level brackets, wherein each bracket rail is vertically adjustable by unscrewing the thumbscrew corresponding to the bracket rail.

* * * * *